3,076,119
DIFFERENTIAL MODE OF DETECTION OF A
VOLTAGE SOURCE
Frederick R. Fluhr, Fort Foote, Md., assignor to the United States of America as represented by the Secretary of the Navy
Filed June 30, 1959, Ser. No. 824,161
6 Claims. (Cl. 315—26)
(Granted under Title 35, U.S. Code (1952), sec. 266)

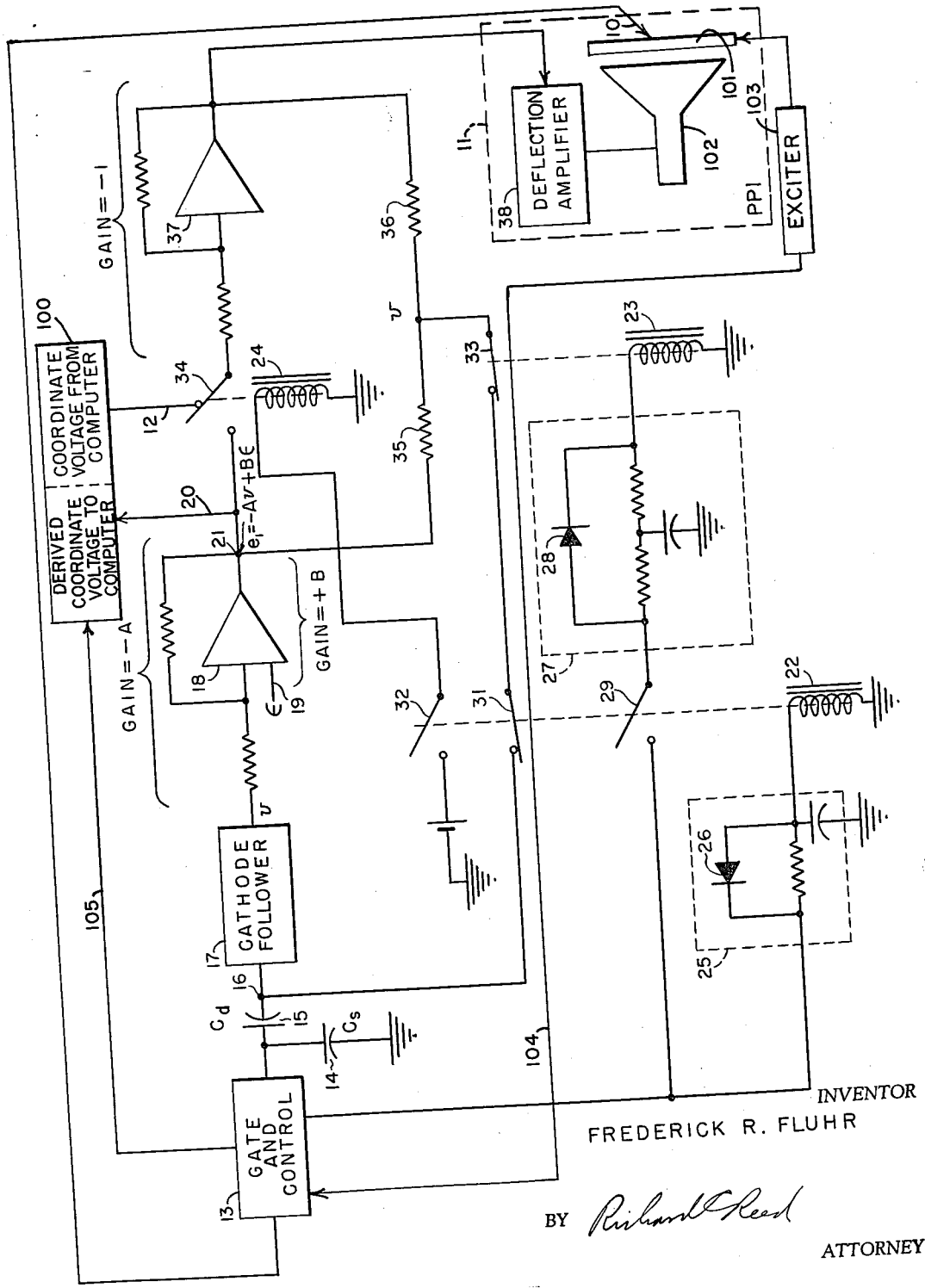

The invention described herein may be manufactured and used by or for the Government of the United States of America for governmental purposes without the payment of any royalties thereon or therefor.

This invention relates to modes of detecting voltage sources, and more particularly, to the differential mode of detection of a voltage source.

It is often desirable to place a marker, such as a secondary signal of relatively stronger intensity which is inserted during the retrace time, on a particular signal displayed on a cathode ray tube display on a target, on a radar, or sonar display, and to place a marker on a cathode ray tube display to indicate that signal which is desired to be indicated or that target which is being tracked on a radar or sonar display. It is desirable that the marker can be positioned on a selected signal instantly and without exercise of time consuming locating techniques. Further, it is necessary that the marker moving means does not introduce errors into the system when the marker moving means is introduced into the system and when it is removed therefrom.

The circuit of this invention has provided a solution to all of the problems and meets the requirements of successful operation of a detecting means for a voltage source. A marker is placed on a cathode ray tube which represents the coordinate values supplied by a computer to a deflection amplifier for the cathode ray tube. When it is desired to move the marker, a conductive probe is placed in contact with a resistance network on a conductive glass which overlies the cathode ray tube. Circuitry is provided whereby the voltage level derived by the placement of the probe on the conductive glass is fed into the deflection amplifier to change the coordinate values supplied by the computer to be new values determined by the location of the probe. Differential means are provided whereby the probe when placed in contact with the conducting glass need not be placed directly over the marker in order to move the marker to a new location. Temporary storage means are provided to retain the marker voltage levels during placement of and the removal of the probe in contact with the conductive glass. Stabilizing means are included to maintain the relative values of the coordinate voltages at the input and the output of the marker moving circuits.

It is, therefore, an object of this invention to provide a means for positioning a marker.

Another object of this invention is to provide a means for selecting signals on a cathode ray tube which are to be observed.

Still another object of this invention is to provide a means for selecting signals on a cathode ray tube whereby such means will not introduce error signals into the marker position.

A further object is to provide a marker moving means which includes temporary storage means for preventing the loss of the marker voltage levels during transient conditions which occur when the marker moving means is introduced into and when it is removed from operation.

A still further object is to provide a marker moving means which is stable.

Another object of this invention is to provide a means for detecting a voltage source by a differential mode.

Another object is to provide a means of vernier control of a marker by a probe.

These and other features of the invention as well as additional objects therefor will become apparent by reference to the ensuing description and the accompanying drawings in which:

The single drawing is a schematic diagram of a preferred embodiment of the voltage detector of this invention.

Briefly the circuit of this invention is a control circuit for a marker being displayed on a cathode ray tube by sensing voltage from a conducting glass overlay with a probe. A computer provides the coordinate values in the form of voltage levels of a signal appearing on the cathode ray tube to position a marker thereon. If it is desired that a particular signal on the cathode ray tube is to be indicated by the marker, the circuit of this invention enables an operator to place a probe on the conducting glass overlay at any location and control the movement of the marker. The location of the probe and the marker may be the same or different as desired. This circuit enables the probe activity to control the marker position as long as the probe is in contact with the conductive glass. The accurate coordinate values of the marker which are derived by the activity of the probe are transferred to the computer for storage and are displayed on the cathode ray tube through the deflection amplifiers. The deflection amplifiers are used by the probe circuitry while the probe is being used to reposition the displayed marker. Obviously, a plurality of remote repeater stations could be supplied with the coordinate values for display. The circuit of this invention includes cancelling means for the unwanted signals produced by the placement of the probe on the conductive glass and during the removal therefrom. Once the marker is repositioned by the probe and the probe is removed, the marker is controlled by the computer.

This invention includes, as essential elements, a gate and control circuit, a storage capacitor, a differential capacitor, stabilizing circuit, a coordinate voltage from a computer, a feedback network and delay circuit to select the interconnections of the several elements to accommodate for the changes in the signal caused by the introduction and the removal of the voltage source.

The structure of this invention includes a probe 10, such as a conducting silicon rubber probe. The probe 10 is placed in contact with a voltage source 101 which overlies a cathode ray tube 102. The cathode ray tube comprises a conducting glass overlay with a resistor network, capable of generating coordinate voltages, thereon. An exciter 103 supplies the conducting glass voltage source 101. The location of the probe on the conducting glass overlay is represented by D.C. potential which represent the probe coordinates. The probe is connected to a gate and control circuit 13. Exciter 103 synchronizes the circuit 13 by means 104 and the computer 100 by means 105. The voltage source value detected by the probe is applied across capacitor 14 to ground and is stored thereon during the time the probe is in contact with the conducting glass overlay. A second capacitor 15, called a differential capacitor, is connected to a junction between the gate and control circuit 13 and the capacitor 14 on one side, and on the other side, is connected to a junction 16. A cathode follower is connected to junction 16 so as to present the voltage level $v$ as the input of an operational amplifier 18 having a gain of $-A$. The drift voltage $\epsilon$ within the operational amplifier 18, with respect to the input thereon, is represented by the numeral 19. The amplification factor of the operational amplifier 18 which is added to compensate for the drift voltage $\epsilon$ is $+B$. The output of the first operational amplifier 18 appear across junction 21 and is shown to be: $e_1 = -Av + B\epsilon$
The output $e_1$ is available at a terminal of a switch 3 associated with a relay 24 and also across a resistor 35. The potential at junction 21 is also made available to the computer, symbolized by the numeral 20. The voltage level applied to the computer is the derived coordinate voltage and is transferred to the computer when the probe is lifted from the conducting glass overlay. The other contact of the single pole double throw switch 34 of relay 24 is connected to a coordinate voltage source from the computer 100 by means 12. Switch 34 selectively connects this coordinate voltage from the computer or the derived coordinate voltage as the input of a second operational amplifier 37 having a gain of −1. The output of operational amplifier 37 is applied across resistor 36 to be joined with the voltage across resistor 35 at a junction where the combination of voltage is equal to the coordinate voltage $v$.

The output of the second operational amplifier 37 is also available to the deflection amplifier 38. The voltage $v$ at the junction between resistors 35 and 36 is fed back to junction 16 through switches 31 and 33 of relays 22 and 23, respectively. Resistors 35 and 36 are selected such that the output of the operational amplifier 18 is made to assume a value as nearly equal to the voltage on the input of operational amplifier 37 before switch 34 connects the output of operational amplifier 18 to the input of operational amplifier 37. This feedback loop establishes a differential potential across capacitor 15 which is representative of the difference of the voltage level of the point of contact of the probe with the voltage source 101 and the coordinate voltage from the computer 100. This differential is maintained throughout the period that the probe is in contact with the voltage source 101. It is this differential across capacitor 15 that enables the probe to be placed at any point on the voltage source 101, thereby establishing a difference between the probe coordinate voltage and the coordinate voltage from the computer; which difference is added to the probe coordinate voltage and is supplied to the deflection amplifier 38. The deflection amplifier 38 is a part of a PPI device 11 for presentation of the coordination voltage from a computer. The position of the probe 10 does not ordinarily coincide with the position of the marker which is representative of the coordinate voltage from the computer. Movement of the probe will result in movement of the marker a given relative distance which is determined by the amplification factor −A in the first operational amplifier 18. For example, −A may be set such that the movement of the marker will be some desired fraction of the distance of the movement of the probe in a particular coordinate direction.

Connected between the gate and control circuit 13 and the relay 22 is a resistance-capacitance delay circuit 25 with its unidirectional element 26 which, for example, can be a crystal or a thermionic diode. Delay circuit 25 is polarized so that relay 22 will be energized following a preset delay and will be inactivated instantly. Energization of relay 22 closes a switch 29 which connects the gate and control circuit 13 to a second resistance-capacitance delay circuit 27. The delay circuit 27 includes a unidirectional element 28 which is connected so as to provide fast energization of relay 23 and delay inactuation thereof. Energization of relay 23 opens the switch 33 in the feedback loop.

Energization of the first relay 22 in addition to closing switch 29, opens a switch 31 in the feedback loop, and a switch 32 which connects a power supply to energize relay 24. Energization of relay 24 causes switch 34 to change the connection of the input to the second operational amplifier 37 from the coordinate voltage from computer 100 to the output of the first operational amplifier 18.

It is to be noted that the deflection amplifier 38 can be connected to a plurality of display devices, including a cathode ray tube on which the voltage source 101 is an overlay.

It is further to be noted that the circuit presented in this disclosure provides for the detection of the voltage level of a single coordinate. To add other coordinates, it is only necessary to duplicate the circuitry that follows the gate and control circuit 13 with similar connection to the gate and control circuit 13 and to add duplicate switches 31 on relay 22 and 33 on relay 23 for the additional coordinates.

In the operation of the device of this invention, it is first considered that the probe 10 is not in contact with the voltage source 101. Since no input is applied to the gate and control circuit 13, none of the relays is energized by a control signal therefrom. The only active part of the device is the coordinate voltage from computer 100 which is connected by means 12 through switch 34 and operational amplifier 37 to the PPI device 11 comprising a deflection amplifier 38, cathode ray tube 102 and conducting glass 101. A marker is, as a result, positioned on a cathode ray tube which is representative of the coordinate voltage from the computer. The coordinate value is representative of information stored in the computer, or it is identical with a signal or target appearing on the cathode ray tube, as desired.

In the event that the marker is desired to be relocated, such as to indicate another signal or to track another target, it is then that the probe 10 is placed on the variable voltage source 101, such as a conductive glass resistance network. The proble can be placed on any point on the voltage source 101. Upon the placement of the probe 10 on the voltage source 101, gate and control circuit 13 provides delay circuit 25 with a positive input signal which unidirectional element 26 will not conduct. The resistance-capacitance values of the delay circuit 25 are selected so as to delay the operation of relay 22 until the voltage at junction 16 has been charged to the value of the coordinate value of the position of the displayed marker divided by the amplification factor −A of the operational amplifier 18. Capacitor 14 is then charged to the value detected by probe 10 on the voltage source 101. Differential capacitor 15 has been charged to a value which is representative of the differential between the probe coordinate voltage supplied by the gate and control circuit 13 and the coordinate voltage from computer 12 which is supplied across switch 34, operational amplifier 37, resistors 35 and 36, switches 31 and 33 and junction 16. When the charging of the storage and the differential capacitors is completed, delay circuit 25 provides a signal to energize relay 22. Switch 29 is then closed and a positive signal is available from the gate and control 13 which unidirectional element 28 permits to instantly energize relay 23. The switches 31 and 33 in the feedback loop are now open. Also, switch 32 is closed and relay 24 is energized to connect switch 34 to the output of the first operational amplifier 18 and to disconnect the coordinate voltage from computer 100.

Movement of the probe 10 across the voltage source 11 provides voltage changes that are then available across gate and control circuit 13, differential capacitor 15, junction 16, cathode follower 17 which provides a highly stable output which is proportional to the coordinate voltage derived by probe 10. The output $v$ is applied across operational amplifier 18 where it is subjected to the amplification factor −A which determines the ratio of the movement of the probe to the movement of the marker. This can be a 1 to 1 relationship or a vernier relationship as desired. The positive gain B is used to indicate a point in the circuit 10 to which all circuit drifts may be referred for analysis purposes. The potential available at the output of the operational amplifier 18 across junction 21 is given $e_1$ equals $-Av$ plus $B\epsilon$ where $\epsilon$ is the circuit drift referred to the B gain input. It is readily seen that $e_1$ must be equal to the coordinate voltage from computer 100 so that the marker will not be moved by the operation of switch 34. This voltage is available as the derived coordinate voltage to computer by means 20. For such value to be read out of the computer as the coordinate voltage from computer 100, the voltage values must be equal.

The signal $e_1$ is applied across the operational amplifier 37, which has a gain of −1, to the deflection amplifier 38 which determines the location of the marker on a display tube. Movement of probe 10 is in complete control of the movement of the marker as long as it is in contact with the voltage source 101. The relationship of the position of the probe and the marker which was established by the placement of the probe on the voltage source is maintained by the differential stored across capacitor 15.

Upon the removal of the probe 10 from the voltage source 101, relay de-energizes quickly in order to de-energize relay 24. The diode-resistor-capacitor network in the coil circuit of relay 23 causes a delay in de-energizing relay 23 sufficiently long for the final coordinate voltage $e_1$ to be transferred into the computer at 20. Then relay 23 is de-energized and the feedback loop is once more closed. Relay 22 opens switch 32 which in turn moves switch 34 into contact with means 12. The circuit is again in the condition that it was before the probe was placed in contact with the voltage source except that the marker is now at a new, selected position under control of the coordinate voltage from computer 100, as illustrated in the drawing.

This invention could be considered to have two stable conditions of operation, that is, while the probe is in control of the marker and while the computer is in control of the marker. The circuit provides a means of inserting information into a computer. During the insertion of coordinate data to the computer, the operating conditions were such that the differential control of this invention was needed. The drifts were required to be minimized. The delay of the closing of the feedback loop until the derived coordinate voltages are transferred into the computer provides for the equi-potential condition on the two terminals which switch 34 selects. The change from computer control to probe control requires that the coordinate voltages from the computer be subtracted from the coordinate voltage of the probe location.

The circuit of this invention as well as its environment have been published in NRL Report 5248, U.S. Naval Research Laboratory, Washington, D.C., P.B. 136357, entitled: "The Naval Data Handling System Pickoff Display Converter," by F. R. Fluhr and D. J. McLaughlin.

Obviously many modifications and variations of the present invention are possible in the light of the above teachings. It is therefore to be understood that within the scope of the appended claims the invention may be practiced otherwise than as specifically described.

What is claimed is:

1. In a voltage detection apparatus, a first coordinate voltage source, a second coordinate voltage source, movable probe means for contacting said second coordinate voltage source stabilizing means for providing a signal which is proportional to said second coordinate voltage and equal to said first coordinate voltage, said second coordinate voltage source being connected to said stabilizing means, display means, means for selectively connecting the output of said stabilizing means or said first coordinate voltage source to said display means.

2. The circuit of claim 1, including a differential storage means connected between said movable probe means and to a junction to which is connected said stabilizing means, a feedback loop connected between said means for selective connection and said junction, switch means in said feedback loop, delay means connected to said switch means for controlling the maintenance of the equality of said signal and said first coordinate voltage.

3. In a pickoff display converter for data handling comprising; a display means having coordinate information thereon, a means to extract coordinate information from said display means, a storage means, a connecting means between said storage means and said display means for inserting stored coordinate information on the said display means, means to disconnect said connection means, said disconnect means actuated by said extracting means, means to retrace extracted coordinate information on said display means, said retrace means actuated by said extracting means.

4. The device described in claim 3 including, means to connect said retrace means for automatically transferring extracted coordinate information to said storage means, said retrace means comprising a differential means of tracking whereby the voltage applied to the said display means remains constant after the said disconnect means is actuated.

5. In a pickoff display converter comprising; a display means, a marker means in said display means, a probe means for extracting coordinate potentials from said display means, a first signal source from said display means, a first terminal, a coordinate information storage means connected to the first terminal for controlling the said marker when said probe is inoperative, a second signal source from said storage means, a second terminal, a stabilization means connected between said second terminal and the said probe, an amplifier, a switch means connected to said amplifier and movable between the first and second terminal by said first signal source, a third terminal, said amplifier connected to said third terminal, said third terminal being connected to said display means for operation of said marker, a feedback means in said stabilization means whereby the voltage at said third terminal remains constant after operation of said switch means from the first terminal to the second terminal.

6. The method of controlling a cathode ray oscilloscope to cause the same to furnish simultaneous observation of tracking signals and a controllable marking signal comprising, applying primary coordinate potentials to the deflection amplifiers of the oscilloscope to establish a marking signal, and thereafter controlling the marking signal by a differential mode of tracking, applying secondary coordinate potentials with a timing influence between the primary and secondary potentials, supplying a stabilization means with a feedback to reduce drift, thereby holding the marking signal constant when the secondary coordinate potentials are applied so that the marking signal is influenced directly by the differential potential.

References Cited in the file of this patent

UNITED STATES PATENTS

| 2,089,430 | Boys | Aug. 10, 1937 |
| 2,439,050 | Mallory | Apr. 6, 1948 |
| 2,487,641 | Denk | Nov. 8, 1949 |
| 2,660,691 | Bertram | Nov. 24, 1953 |
| 2,674,812 | Hales | Apr. 13, 1954 |
| 2,793,320 | Patterson | May 21, 1957 |
| 2,951,181 | Sugarman | Aug. 30, 1960 |